US009758391B2

(12) United States Patent
Yang et al.

(10) Patent No.: US 9,758,391 B2
(45) Date of Patent: Sep. 12, 2017

(54) CAPACITIVE DEIONIZATION ELECTRODES, CAPACITIVE DEIONIZATION APPARATUSES INCLUDING THE SAME, AND PRODUCTION METHODS THEREOF (71) Applicant: Samsung Electronics Co., Ltd., Suwon-Si, Gyeonggi-Do (KR)

(72) Inventors: Yoo Seong Yang, Yongin-si (KR); Jae Eun Kim, Hwaseong-si (KR); Hyun Seok Kim, Seoul (KR); Seung Jae Lee, Suwon-si (KR); Hyo Rang Kang, Anyang-si (KR); Joon Seon Jeong, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 300 days.

(21) Appl. No.: 14/573,522

(22) Filed: Dec. 17, 2014

(65) Prior Publication Data
US 2015/0175449 A1 Jun. 25, 2015

(30) Foreign Application Priority Data
Dec. 24, 2013 (KR) .................. 10-2013-0162971

(51) Int. Cl.
C02F 1/461 (2006.01)
C02F 1/469 (2006.01)
C25B 11/12 (2006.01)
(52) U.S. Cl.
CPC ........ C02F 1/4691 (2013.01); C02F 1/46109 (2013.01); C25B 11/12 (2013.01); C02F 2001/46133 (2013.01); C02F 2001/46138 (2013.01); C02F 2303/22 (2013.01)
(58) Field of Classification Search
CPC . C02F 1/46109; C02F 1/46114; C02F 1/4691
USPC ........................................................ 204/294
See application file for complete search history.

(56) References Cited

U.S. PATENT DOCUMENTS

| | | | |
|---|---|---|---|
| 4,082,694 A | 4/1978 | Wennerberg et al. |
| 4,285,831 A | 8/1981 | Yoshida et al. |
| 4,346,067 A | 8/1982 | Wachter |
| 5,057,296 A | 10/1991 | Beck |
| 5,626,977 A | 5/1997 | Mayer et al. |
| 6,051,205 A | 4/2000 | Yamamoto et al. |
| 6,111,054 A | 8/2000 | Haubennestel et al. |
| 6,359,019 B1 | 3/2002 | Stone et al. |
| 7,312,260 B2 | 12/2007 | Krappe et al. |
| 7,582,684 B2 | 9/2009 | Rasmussen et al. |
| 7,947,777 B2 | 5/2011 | Haubennestel et al. |
| 2,759,975 A1 | 8/2011 | Andelman et al. |
| 8,002,963 B2 | 8/2011 | Andelman et al. |

(Continued)

FOREIGN PATENT DOCUMENTS

IN WO 2009077276 A1 * 6/2009 .......... C02F 1/46109
KR 10-2004-0105574 A 12/2004

(Continued)

Primary Examiner — Brian W Cohen
(74) Attorney, Agent, or Firm — Harness, Dickey & Pierce, P.L.C.

(57) ABSTRACT

A capacitive deionization electrode may include a conductive material and a polymer on a surface of the conductive material. The polymer may have at least one functional group in a single polymer chain.

24 Claims, 9 Drawing Sheets (56) References Cited

U.S. PATENT DOCUMENTS

| | | |
|---|---|---|
| 8,158,196 B2 | 4/2012 | Moya |
| 8,192,595 B2 | 6/2012 | Yang et al. |
| 2007/0248760 A1 | 10/2007 | Chmelka et al. |
| 2008/0144256 A1* | 6/2008 | Cai ................... C02F 1/4691 361/502 |
| 2009/0020430 A1 | 1/2009 | Yang et al. |
| 2010/0238606 A1 | 9/2010 | Dreissig et al. |
| 2012/0228215 A1 | 9/2012 | Yang et al. |
| 2013/0129592 A1 | 5/2013 | Kim et al. |
| 2013/0178356 A1 | 7/2013 | Kim et al. |
| 2013/0264209 A1 | 10/2013 | Kwon et al. |

FOREIGN PATENT DOCUMENTS

| | | |
|---|---|---|
| KR | 2009-0008622 A | 1/2009 |
| KR | 2009-0085756 A | 8/2009 |
| KR | 2010-0086283 A | 7/2010 |
| KR | 1063913 A | 9/2010 |
| KR | 1029090 A | 2/2011 |
| KR | 2012-0057750 A | 6/2012 |
| KR | 10-1139966 B1 | 7/2012 |
| KR | 2012-0094548 A | 8/2012 |
| KR | 10-2012-0101789 A | 9/2012 |
| KR | 1237258 B1 | 2/2013 |
| KR | 10-2013-0056649 A | 5/2013 |
| KR | 10-2013-0081012 A | 7/2013 |
| KR | 10-2013-0113817 A | 10/2013 |
| WO | WO-2005097872 A1 | 10/2005 |
| WO | WO-2013183973 A1 | 12/2013 |

\* cited by examiner

CAPACITIVE DEIONIZATION ELECTRODES, CAPACITIVE DEIONIZATION APPARATUSES INCLUDING THE SAME, AND PRODUCTION METHODS THEREOF

CROSS-REFERENCE TO RELATED APPLICATION

This application claims priority under 35 U.S.C. §119 to Korean Patent Application No. 10-2013-0162971, filed in the Korean Intellectual Property Office on Dec. 24, 2013, the entire contents of which are incorporated herein by reference.

BACKGROUND

1. Field

The present disclosure relates to capacitive deionization electrode materials, capacitive deionization electrodes and apparatuses including the same, and production methods thereof.

2. Description of the Related Art

In some parts of the world, the water supply may include a relatively large amount of minerals. For instance, in Europe, limestone is frequently found in groundwater. Thus, tap water in these regions may contain a relatively large amount of minerals. Water having a relatively high mineral content (i.e., hard water) may cause problems, including frequent occurrences of lime scale in the interior walls of pipes and decreases in energy efficiency when such water is used in home installations such as heat exchangers and/or boilers. Moreover, hard water is inappropriate to use as wash water. As a result, an appropriate technology is utilized for removing ions from hard water to make it into soft water, in particular, in an environmentally friendly manner. Furthermore, the use of seawater desalination to obtain water has been increasing as larger and more populated areas begin to experience water shortages.

A capacitive deionization (CDI) apparatus is a device that applies a voltage to porous electrodes having nano-sized pores to provide them with a polarity. As a result, ionic materials are adsorbed from a medium, such as hard water, onto the surface of the electrodes, thereby removing the same therefrom. In the CDI apparatus, when a medium containing dissolved ions flows between two electrodes of a positive electrode and a negative electrode and DC power having a relatively low potential difference is applied thereto, the anionic components and the cationic components among the dissolved ions are adsorbed and concentrated onto the positive electrode and the negative electrode, respectively. When an electric current flows in a reverse direction between the two electrodes by, for example, short-circuiting the two electrodes, the concentrated ions are detached from the electrodes. Since the CDI apparatus does not require a high potential difference, its energy efficiency is high, toxic heavy metal ions may be removed together with the hardness ions, and its recycling process does not need any chemicals. In order to efficiently operate the CDI apparatus, it is desired to develop an electrode material capable of exhibiting enhanced deionization efficiency.

SUMMARY

Some embodiments of the present disclosure relate to a capacitive deionization electrode configured to provide enhanced deionization efficiency.

Some embodiments of the present disclosure relate to methods of producing capacitive deionization electrodes.

Some embodiments of the present disclosure relate to a capacitive deionization apparatus including the capacitive deionization electrodes.

According to an example embodiment of the present disclosure, a capacitive deionization electrode may include a conductive material and a polymer existing on a surface of the conductive material, the polymer having at least one functional group in a single polymer chain.

The conductive material may include a porous material selected from $TiO_2$, $TiN$, $SiO_2$, and $Si_3N_4$; a carbon material; a conductive metal oxide; or a combination thereof.

The carbon material may be at least one selected from activated carbon, carbon nanotubes, activated carbon fibers, carbon aerogel, mesoporous carbon, and a combination thereof.

The carbon material may include aluminum in an amount of about 5 to 30% by weight and silicon in an amount of about 15 to 20% by weight, respectively, based on a total weight of all substances other than carbon. The carbon material may have a specific surface area of greater than or equal to about 900 $m^2/g$, and an average particle size of less than or equal to about 100 μm.

The capacitive deionization electrode may further include an electrically conducting agent and a binder.

The conductive material may have a coating including the polymer on a surface thereof.

The polymer may include 1 to 10 functional groups selected from a carboxyl group (—COOH), —$NO_2$, N, an ammonium salt group (—$NR_3^+$), a phosphate group ($PO_4^{3-}$), a sulfonic acid salt group, and a hydroxyl group.

The polymer may include a polyester repeating unit, a polyether repeating unit, an alkyl moiety, a polyaminoamide repeating unit, a polyurethane repeating unit, or a combination thereof. The polymer may comprise a branched polymer having a functional group at a terminal end thereof.

The polymer may have a weight average molecular weight of greater than or equal to about 100,000.

The polymer may have an acid value of greater than or equal to about 30 mg KOH/g and an amine value of greater than or equal to about 30 mg KOH/g.

According to another example embodiment of the present disclosure, a method of producing a capacitive deionization electrode may include obtaining a binder solution including an electrically conducting agent and a binder. The method may additionally include preparing either a conductive material having a polymer coated on a surface thereof or an aqueous dispersion including the conductive material and the polymer, the polymer having at least one functional group in a single polymer chain. The method may also include mixing the binder solution with the aqueous dispersion or the conductive material having a polymer coated on the surface thereof to obtain a slurry. The method may further include applying the slurry on an electrically conducting support.

The preparing of the conductive material having a polymer coated on the surface thereof may include obtaining an aqueous dispersion including the conductive material and the polymer; ultra-sonicating the aqueous dispersion; and separating the conductive material having the polymer coated on a surface thereof from the ultra-sonicated aqueous dispersion.

According to another example embodiment of the present disclosure, a capacitive deionization apparatus may include a capacitive deionization electrode, wherein the electrode includes a conductive material and a polymer having at least one functional group in a single polymer chain.

In the aforementioned example embodiments, the electrode material for capacitive deionization (e.g., an active material) has a charge barrier formed on its surface so as to facilitate attracting a desired ion and repelling a counter ion, thereby making it possible to achieve enhanced charge separation efficiency and increased ion removal capacity and thus providing highly purified water in an effective manner in terms of environment and costs. In addition, the aforementioned capacitive electrode may be prepared using less of a binder.

DETAILED DESCRIPTION

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, the term "capacitive deionization apparatus" refers to a device that may separate/concentrate ions by passing fluids including at least one ion component to be separated or concentrated through a flow path defined between at least one pair of porous electrodes while applying a voltage thereto so as to adsorb the ion components onto the surfaces of the pores in the electrodes. The capacitive deionization apparatus may have any geometry, and apparatuses having various structures are known in the art.

The capacitive deionization electrode according to an example embodiment may be used in any capacitive deionization apparatus. The capacitive deionization electrode may include a conductive material and a polymer on a surface of the conductive material. The polymer may have at least one functional group in a single polymer chain. The single polymer chain may be in linear or branched form. In the capacitive deionization apparatus according to a non-limiting embodiment, a voltage is applied to a pair of porous (carbon) electrodes and a fluid is flowed through a space between the electrodes (e.g., a spacer), and thereby ions contained in the fluid are adsorbed onto surfaces of the electrodes. The electrodes may be used as a positive electrode and/or a negative electrode.

The conductive material may be a porous material selected from $TiO_2$, TiN, $SiO_2$, and $Si_3N_4$, a carbon material, a metal oxide such as NiO, or a combination thereof.

The porous material may have an average pore size of less than or equal to about 300 nm, for example less than or equal to about 250 nm, less than or equal to about 200 nm, less than or equal to about 100 nm, less than or equal to about 50 nm, or less than or equal to about 30 nm, and a specific surface area of greater than or equal to about 30 m²/g, for example greater than or equal to about 35 m²/g, greater than or equal to about 50 m²/g, or greater than or equal to about 100 m²/g. The porous material may be synthesized in any known method or is commercially available. Examples of a commercially available product include $TiO_2$ (CAS No. 13463-67-7), TiN (CAS No. 25583-20-4), $SiO_2$ (CAS No. 7631-86-9), and $Si_3N_4$ (CAS No. 12033-89-5), for example, from Aldrich Co., Ltd.

The carbon material is a porous conductive material, and may include at least one selected from activated carbon such as activated carbon powder or activated carbon granules, carbon nanotubes (CNT), activated carbon fiber, carbon aerogel, mesoporous carbon, and graphite oxide.

When the activated carbon is used as the carbon material, it may include aluminum (Al) in an amount of about 5 to 30 wt % and silicon (Si) in an amount of about 15 to 20 wt %, based on a total amount of substances included therein other than carbon. The activated carbon may have a specific surface area of greater than or equal to about 500 m²/g, for example greater than or equal to about 900 m²/g. The activated carbon may have a specific surface area of less than or equal to about 1500 m²/g, for example less than or equal to about 1200 m²/g. The carbon material may have an average particle size of less than about 100 μm but it is not limited thereto.

The metal oxide may be synthesized in any known method or is commercially available. Examples of a commercially available product include NiO (CAS No. 1313-99-1) from Aldrich Co., Ltd.

In the capacitive deionization electrode, the conductive material is surface modified with the polymer having at least one functional group in a single polymer chain. In some embodiments, the polymer having at least one functional group in a single polymer chain may be present as a coating on at least a part of the surface of the conductive material. In the polymer, the number of functional groups is at least one, and the functional group may be selected from a carboxyl group (—COOH), —NO₂, N, an ammonium salt group (—NR₃⁺), a phosphate group ($PO_4^{3-}$), a sulfonic acid salt group, and a hydroxyl group. In some embodiments, the number of functional groups included in a single polymer chain is at least two, for example 2 to 10, and the functional group may be selected from a carboxyl group (—COOH), —NO₂, N, an ammonium salt group (—NR₃⁺), a phosphate group ($PO_4^{3-}$), a sulfonic acid salt group, a hydroxyl group, and a combination thereof. The polymer may include a group capable of forming an anion and a group capable of forming a cation in a single chain as the functional group. In other words, the polymer may be an amphoteric polymer.

The polymer may include a polyester repeating unit, a polyether repeating unit, a polyalkylene repeating unit, a polyaminoamide repeating unit, a polyurethane repeating unit, or a combination thereof. The polymer may be a branched polymer having a functional group at a terminal end thereof. The polymer may be an alkylol ammonium salt compound of an acidic polymer having a high molecular weight. In some embodiments, the polymer may have one functional group or three functional groups in a single chain, and may be as schematically illustrated as below. However, it should be understood that example embodiments are not limited thereto. For instance, in other embodiments, the polymer may have up to ten functional groups in a single chain.

● : functional group
   (e.g., —COOH, —NO₂, N, $PO_4^{3-}$, $NR_4^-$)
⁓ : tail (e.g., polyester moiety, polyether moiety, alkyl moiety, polyacryl moiety, polyurethane moiety, or a combination thereof)

As illustrated above, the polymer may include a functional group and a tail component. When the polymer is in linear form, the functional group may be between the end regions of the polymer. Alternatively, the functional group may be at a terminal end of the polymer. Additionally, if two or more functional groups are present, one or more functional groups may be between the end regions of the polymer, while the other of the functional group(s) may be at the terminal end(s) of the polymer.

When the polymer is in branched form, one or more functional groups may be between the end regions of the polymer. Alternatively (or additionally), one or more functional groups may be at the terminal end(s) of the polymer. In a non-limiting embodiment, a majority or all of the branches may include one or more functional groups.

Without wanting to be bound by any theory, in the capacitive deionization electrode, the polymer having the aforementioned structure may modify or coat a surface of the conductive material (e.g., a porous carbon material) or may exist adjacent to a surface of the conductive material, thereby acting as a charge barrier that may facilitate attracting desired ions to the surface of the electrode active material (e.g., a carbon material) and repel counter ions to the counter electrode. In addition, due to the presence of the aforementioned polymer on a surface thereof, the electrode may hold the adsorbed ions for an extended period of time. Accordingly, when capacitive deionization is carried out using the electrode of the example embodiment, ions may be separated from the medium at a higher efficiency and the apparatus may exhibit enhanced capacity of deionization/adsorption.

Figure 5:
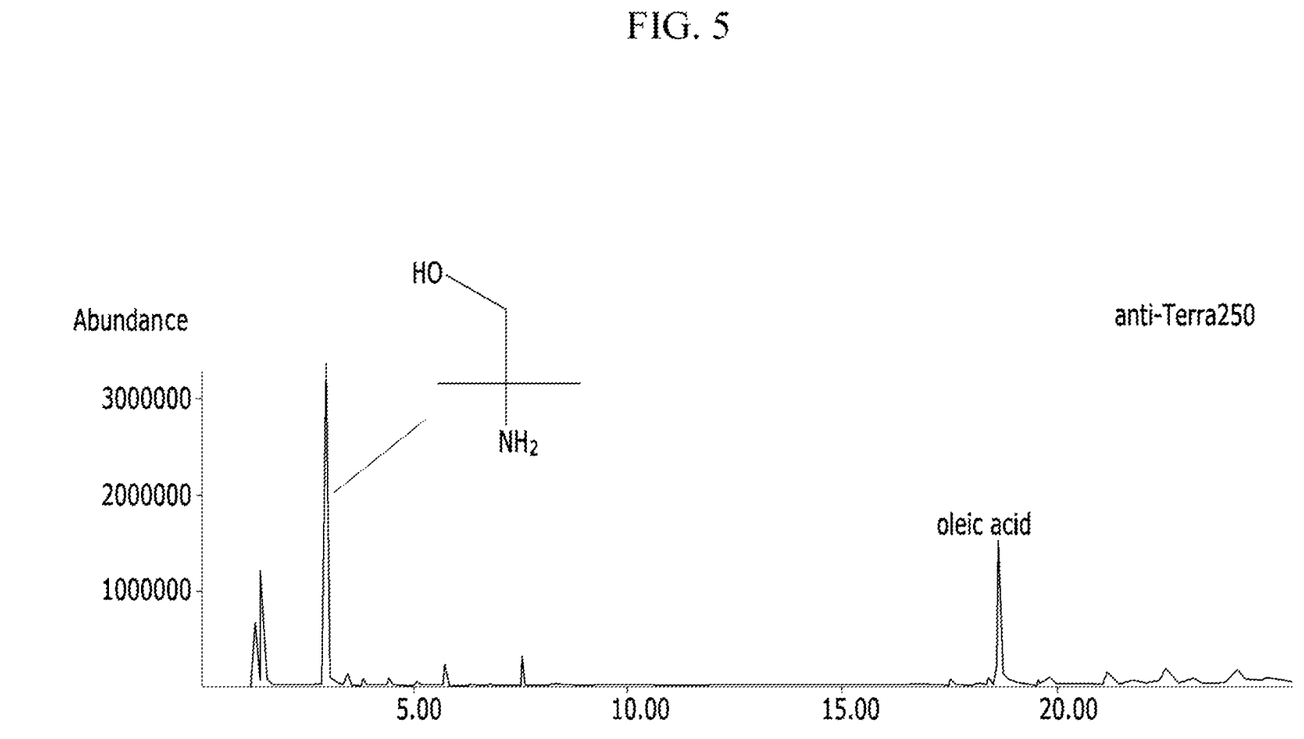
FIG. 5 is a graphical view illustrating the results of a gas chromatography-mass spectroscopy analysis of Anti-Terra 250 (manufactured by BYK Co., Ltd.).
Figure 6:
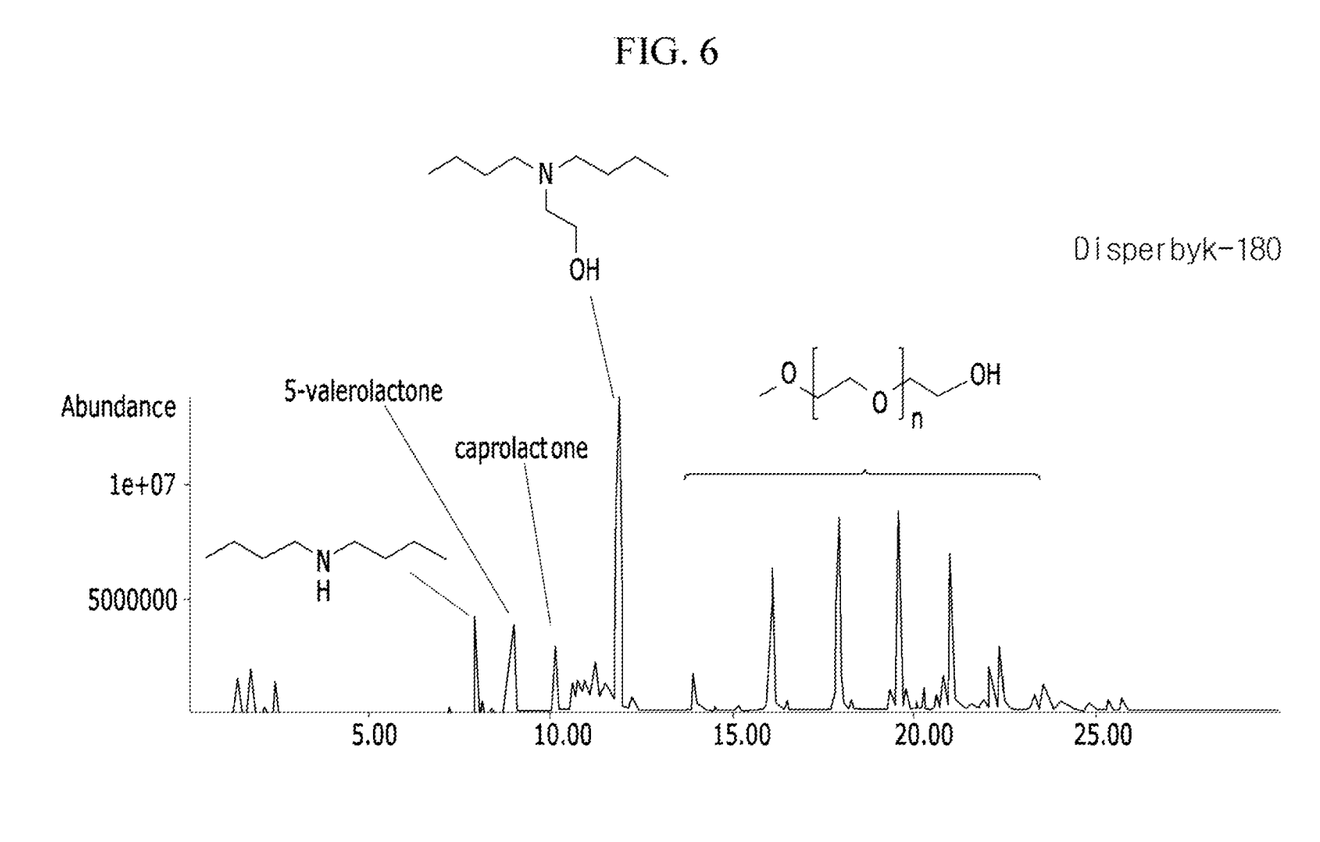
FIG. 6 is a graphical view illustrating the results of a gas chromatography-mass spectroscopy analysis of Disperbyk 180 (manufactured by BYK Co., Ltd.).

The polymer of the aforementioned structure having at least one functional group (for example, one functional group or two to five functional groups) in a single chain may be prepared in any known method, or is commercially available. In some embodiments, the polymer having the aforementioned structure may be prepared in a process disclosed in U.S. Pat. Nos. 2,759,975, 7,312,260, and 6,111,054, or PCT Publication No. WO2005/097872, all of which are incorporated herein by reference. In some embodiments, it is possible to use any of Anti-Terra series products (from BYK Co., Ltd) such as Anti-Terra 250, 202, 203, 206, 207, or Disperbyk series products (from BYK Co., Ltd) such as Disperbyk-180, 181, 182, 183, 184, 185, 187 as the aforementioned polymer. FIG. 5 shows gas chromatography-mass spectroscopy (GC-MS) analysis results of Anti-Terra 250 from BYK Co., Ltd that may be used as the polymer. The results of FIG. 5 confirm that Anti-Terra 250 is a polymer having an amine group and a hydroxyl group at its respective ends. FIG. 6 shows GC-MS analysis results of Disperbyk-180 from BYK Co., Ltd. The results of FIG. 6 confirm that Disperbyk-180 is a polymer having a polyethylene oxide moiety and a hydroxyl group at its respective ends.

The polymer may have a weight average molecular weight of greater than or equal to about 10,000, for example greater than or equal to about 50,000, or greater than or equal to about 100,000. The polymer having a high weight average molecular weight of greater than or equal to about 100,000 may modify or coat a surface of the conductive material (e.g., carbon material) with relative ease. The polymer may have an acid value of greater than or equal to about 30 mg KOH/g, for example about 35 mg KOH/g to about 95 mg KOH/g. The polymer may have an amine value of greater than or equal to about 30 mg KOH/g, for example, about 35 mg KOH/g to about 95 mg KOH/g. When the acid value and the amine value are within the foregoing ranges, the polymer chains may interpenetrate with each other, thereby anchoring to the electrode material to a higher degree and playing an enhanced role as a charge barrier. The amount of the polymer having at least one functional group is in a range of about 0.01 to about 60% by weight, for example 1 to 30% by weight, based on the amount of the conductive material. The electrode including the conductive material and the polymer having at least one functional group on the surface of the conductive material may be prepared using a reduced amount of binder. The electrode according to example embodiments may also have a higher BET surface area than conventional electrodes prepared using a conventional binder. Therefore, the electrode of the aforementioned embodiments may exhibit enhanced performance when used in a capacitive deionization apparatus.

The electrode according to example embodiments may further include a binder. The binder may play a role of keeping the conductive material attached and thereby enhancing mechanical properties of the electrode. In other words, the binder may bind the conductive materials to each other to form a continuous structure and help the electrode remain attached to a current collector. The types of acceptable binders are not particularly limited, and it is possible to use any conventional binder that may be used in the production of the electrode. For example, the binder may include at least one hydrophilic polymer. Examples of the hydrophilic polymer may include, but are not limited to, a polyacrylic acid, a poly(acrylic acid-maleic acid) copolymer, polyvinyl alcohol, cellulose, polyvinylamine, chitosan, polyacrylamide, a poly(acrylamide-acrylic acid) copolymer, a poly(styrene-acrylic acid) copolymer, and a combination thereof. If desired, the binder may have a cation exchange group or an anion exchange group. The cation exchange group may be selected from a sulfonic acid group (—$SO_3H$), a carboxyl group (—COOH), a phosphonic acid group (—$PO_3H_2$), a phosphinic acid group (—$HPO_3H$), an arsenic acid group (—$AsO_3H_2$), and a selenonic acid group (—$SeO_3H$), and the anion exchange group may be selected from a quaternary ammonium salt (—$NH_3^+$), a primary, secondary, or tertiary amine group (—$NH_2$, —NHR, or —NR), a quaternary phosphonium group (—$PR_4^+$), and a tertiary sulfonium group (—$SR_3^+$). In other embodiments, the binder may include at least one hydrophobic polymer selected from polystyrene, polyvinylchloride, a carboxylated polyvinylchloride, polyvinylfluoride, a polyamide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, and a combination thereof. As the binder, the molecular weight of the polymer is not particularly limited and may be selected appropriately. The amount of the binder being used is not particularly limited and may be selected appropriately. For example, the amount of the binder being used may range from about 15 vol % to about 27 vol % based on a total volume of the conductive material, but it is not limited thereto.

The electrode may further include an electrically conducting agent capable of enhancing the conductivity of the electrode. The types of conducting agents are not particularly limited, and it is possible to use any suitable materials that are used for fabricating electrodes. By way of non-limiting examples, the electrically conducting agent may be selected from carbon materials such as carbon black, vapor growth carbon fiber (VGCF), natural graphite, artificial graphite, acetylene black, ketjen black, and a carbon fiber; metallic materials such as a metal powder or a metal fiber of copper, nickel, aluminum, or silver; conductive polymers such as a polyphenylene derivative; and a mixture thereof. The amount of the electrically conducting agent is not particularly limited and may be selected appropriately. For example, the electrically conducting agent may be used in an amount of about 30% by weight to about 60% by weight, based on a total weight of the conductive material, but it is not limited thereto.

The electrode may further include an agent for facilitating ion removal. In some embodiments, examples of the agent of facilitating ion removal may include, but are not limited to, quaternary butylammonium hydroxide, quaternary butylammonium acetate, and sulfoacetic acid.

The thickness of the electrode is not particularly limited, but may be appropriately selected. For example, the thickness of the electrode may range from about 50 μm to about 500 μm, for example about 100 μm to about 300 μm.

The electrically conducting support may be a current collector. When multiple pairs of electrodes are included in a capacitive deionization apparatus as described below, both sides of the current collector may be combined with the electrodes. The current collector is electrically connected to a power source, thereby applying a voltage to the electrode(s). The current collector may include a graphite plate or a graphite foil. The current collector may include at least one metal selected from the group consisting of Cu, Al, Ni, Fe, Co, and Ti, or a metal mixture or alloy thereof. The current collector may be in the form of a sheet, a foam, or a mesh, but it is not limited thereto.

In another embodiment, a method of producing a capacitive deionization electrode may include obtaining a binder solution including an electrically conducting agent and a binder. The method may additionally include preparing either a conductive material having a polymer coated on a surface thereof or an aqueous dispersion including the conductive material and the polymer. The polymer may have at least one functional group in a single polymer chain. The method may also include mixing the binder solution with the aqueous dispersion or the conductive material having a polymer coated on the surface thereof to obtain a slurry. The method may also include applying the slurry on an electrically conducting support. The method may further include heating the slurry applied to the electrically conducting support at a temperature of greater than or equal to about 50° C., for example from about 50° C. to about 150° C., or greater than or equal to about 120° C.

Details of the electrically conducting agent, the conductive material, the polymer having at least one functional group, and the electrically conducting support (e.g., a current collector) may be the same as set forth above. The binder solution may be obtained in any suitable manner. The mixing ratio between the electrically conducting agent and the binder, the concentration of the slurry, and the mixing method may be selected appropriately. Preparation of the aqueous dispersion including the conductive material and the polymer may be accomplished in any proper manner. For example, a predetermined or desired amount of the conducting material (e.g., the carbon material) and a predetermined or desired amount of the polymer may be homogenized in water to prepare the aqueous dispersion. The duration and the temperature of the homogenization may be selected appropriately. The binder solution may further include a curing agent such as succinic acid anhydride, an ionic additive such as a succinic agent, or the like.

The preparing a conductive material (having a polymer with at least one functional group in a single chain coated on a surface thereof) may include preparing an aqueous dispersion including the conductive material and the polymer; ultra-sonicating the aqueous dispersion; and separating the conductive material having the polymer coated on a surface thereof from the ultra-sonicated aqueous dispersion. The preparation of the aqueous dispersion may be the same as set forth above. The duration and the temperature of the ultra-sonication may be appropriately selected, for example in light of the amount of the polymer and the conductive material. By way of an example, the ultrasonication may be conducted for greater than or equal to 1 minute at room temperature or higher. The ultrasonication may provide the conductive material (e.g., the carbon material) being surface-coated (e.g., surface-modified) with the polymer having at least one functional group. The conductive material as coated may be filtered, washed with water, and then dried.

The aqueous dispersion or the conductive material having the polymer coated on its surface is mixed with the binder solution to prepare a slurry, which is then applied to an electrically conducting support (e.g., the current collector) and then heat-treated. The method of applying and the heat treating conditions (e.g., time and temperature) are not particularly limited. For example, the application may be accomplished using an automatic film applicator, and the heat-treating may be conducted at a temperature of greater than or equal to about 50° C. (e.g., from about 50° C. to about 150° C., or greater than or equal to about 120° C.) for a predetermined or desired amount of time.

In another example embodiment, a capacitive deionization apparatus may include a capacitive deionization electrode, wherein the electrode includes a conductive material and a polymer having at least one functional group in a single polymer chain. Details of the conductive material, the polymer, and the electrode may be the same as set forth above.

Figure 1:
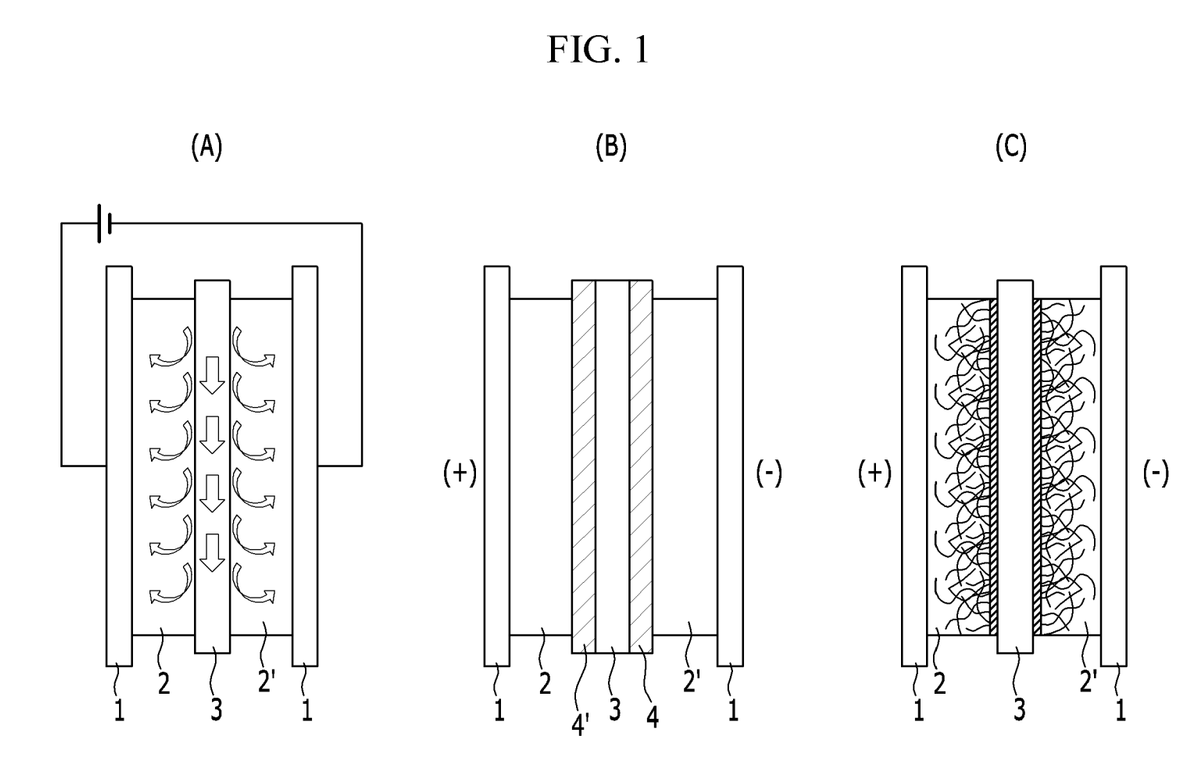
FIG. 1 is a schematic view showing non-limiting examples of a capacitive deionization apparatus according to one embodiment.

Specific types of the capacitive deionization apparatus are not particularly limited. The capacitive deionization apparatus may have any geometry or any structure. By way of non-limiting examples, the capacitive deionization apparatus may have a schematic structure as shown in FIG. 1 (A) to (C). Hereinafter, the capacitive deionization apparatus will be explained with reference to the drawings.

Referring to FIG. 1 (A), electrodes 2 and 2' are coated on a current collector 1, and a spacer structure 3 is inserted between the electrodes 2 and 2' to provide a flow path. In the capacitive deionization apparatus shown in FIG. 1 (B), electrodes 2 and 2' are coated on a current collector 1, a spacer structure 3 is inserted between the electrodes 2 and 2' to provide a flow path, and a cation permselective membrane 4 or 4' and an anion permselective membrane 4' or 4 are inserted between the electrode 2 or 2' and the spacer structure 3. In addition, in the case of the apparatus shown in FIG. 1 (C), electrodes 2 and 2' are coated on a current collector 1, and a spacer structure 3 is inserted between the electrodes 2 and 2' to define a flow path, wherein the electrode 2 is a positive electrode (or a negative electrode) using an anion (or cation) exchange binder, and the electrode 2' is a negative electrode (or a positive electrode) using a cation (or anion) exchange binder.

During operation of the capacitive deionization apparatus, a fluid including ions is supplied through the flow path while a voltage is applied from a power source to the pair of electrodes so that the ions included in the fluid may be adsorbed onto the electrodes. When a voltage is applied in a reverse direction between the pair of electrodes, the ions being adsorbed thereto may be desorbed.

The fluid including ions and supplied to the capacitive deionization apparatus is not particularly limited and may be sea water or hard water containing hard ions such as calcium ions or magnesium ions. The capacitive deionization apparatus including the electrode according to an example embodiment may include a charge barrier formed on the electrode active material, thereby exhibiting high charge separation efficiency and enhanced deionization performance so as to produce highly purified water. The flow rate of supplying the fluid is not particularly limited and may be adjusted as necessary. For example, the flow rate may range from about 5 mL/min to about 50 mL/min.

When the fluid is supplied while a voltage is applied to the electrode, the ions in the fluid are adsorbed onto the surface of the electrode. The applied voltage is selected appropriately in light of cell resistance, an ion concentration of the fluid, and the like. By way of an example, the voltage may be less than or equal to about 2.5 V, for example about 1.0 V to 2.0 V. Ion removal efficiency may be determined by measuring the ion conductivity of the fluid when the voltage is applied. The ion removal efficiency may be greater than or equal to about 50%, for example greater than or equal to about 75%, or greater than or equal to about 90%.

The capacitive deionization apparatus of the foregoing embodiments may find its utility in a range of applications such as production of ultra-pure water, a water purification process for removing a salt (such as desalination of sea water), a deionization process removing a calcium salt (changing hard water into soft water), production of drinking water, a treating system for industrial or domestic water, as well as most home appliances using water such as washing machines, dishwashers, refrigerators, water softeners, and the like.

The following examples illustrate various embodiments of the present disclosure in more detail. However, it is understood that the scope of the present disclosure is not limited to these examples.

EXAMPLES

Example 1

3 g of a polyvinyl alcohol solution (product name: polyvinyl alcohol, Aldrich Co., Ltd., number average molecular weight: 30,000, concentration 0.5 g/ml), 0.74 g of succinic acid anhydride, and 2.89 g of succinic acid are mixed to prepare a solution. 0.45 g of Super P (manufactured by Timcal Co., Ltd.) is added to 0.20 ml of the solution as an electrically conducting agent to obtain a binder solution.

3 g of powder activated carbon PGW (manufactured by Kuraray Chemical Co. Ltd.) and Anti-Terra 250 manufactured by BYK Co., Ltd. (10% by weight based on a total weight of the activated carbon) are mixed in water to prepare an aqueous dispersion.

The binder solution prepared as above and the aqueous dispersion thus prepared are mixed in a ratio of 27:73 (the volume of the binder solution to the volume of the activated carbon included in the aqueous dispersion) to prepare a slurry (having a viscosity of 10 k cPs). The slurry thus prepared is applied to a graphite foil and heat-treated at a temperature of 120° C. to obtain an electrode.

Example 2

An electrode is prepared in the same manner as set forth in Example 1, except that Anti-Terra 250 is used in an amount of 20% by weight.

Example 3

An electrode is prepared in the same manner as set forth in Example 1, except that Anti-Terra 250 is used in an amount of 30% by weight.

Example 4

An electrode is prepared in the same manner as set forth in Example 1, except that the binder solution and the aqueous dispersion are mixed in a ratio of 20:80 (the volume of the binder solution to the volume of the activated carbon included in the aqueous dispersion) to prepare a slurry.

Example 5

An electrode is prepared in the same manner as set forth in Example 1, except that the binder solution and the aqueous dispersion are mixed in a ratio of 10:90 (the volume of the binder solution to the volume of the activated carbon included in the aqueous dispersion) to prepare a slurry.

Example 6

An electrode is prepared in the same manner as set forth in Example 1, except that the binder solution and the aqueous dispersion are mixed in a ratio of 5:95 (the volume of the binder solution to the volume of the activated carbon included in the aqueous dispersion) to prepare a slurry.

Example 7

3 g of a polyvinyl alcohol solution (product name: polyvinyl alcohol, Aldrich Co., Ltd., number average molecular weight: 30,000, concentration 0.5 g/ml), 0.74 g of succinic acid anhydride, and 2.89 g of succinic acid are mixed to prepare a solution. 0.45 g of Super P (manufactured by Timcal Co., Ltd.) is added to 0.20 ml of the solution as an electrically conducting agent to obtain a binder solution.

3 g of powder activated carbon PGW (manufactured by Kuraray Chemical Co. Ltd.) and Anti-Terra 250 manufactured by BYK Co., Ltd. (10% by weight based on a total weight of the activated carbon) are mixed in water and uniformly dispersed therein using a homogenizer to prepare a dispersion. The dispersion thus obtained is subject to ultrasonication and then is washed with water, filtered, and dried under vacuum to obtain a conductive material (i.e., an active material) being surface-modified (or surface-coated) with Anti-Terra 250.

The binder solution prepared as above and the surface-coated active material thus prepared are mixed in a volume ratio of 90:10 to prepare a slurry. The slurry thus prepared is applied to a graphite foil and heat-treated at a temperature of 120° C. to obtain an electrode.

Figure 7:
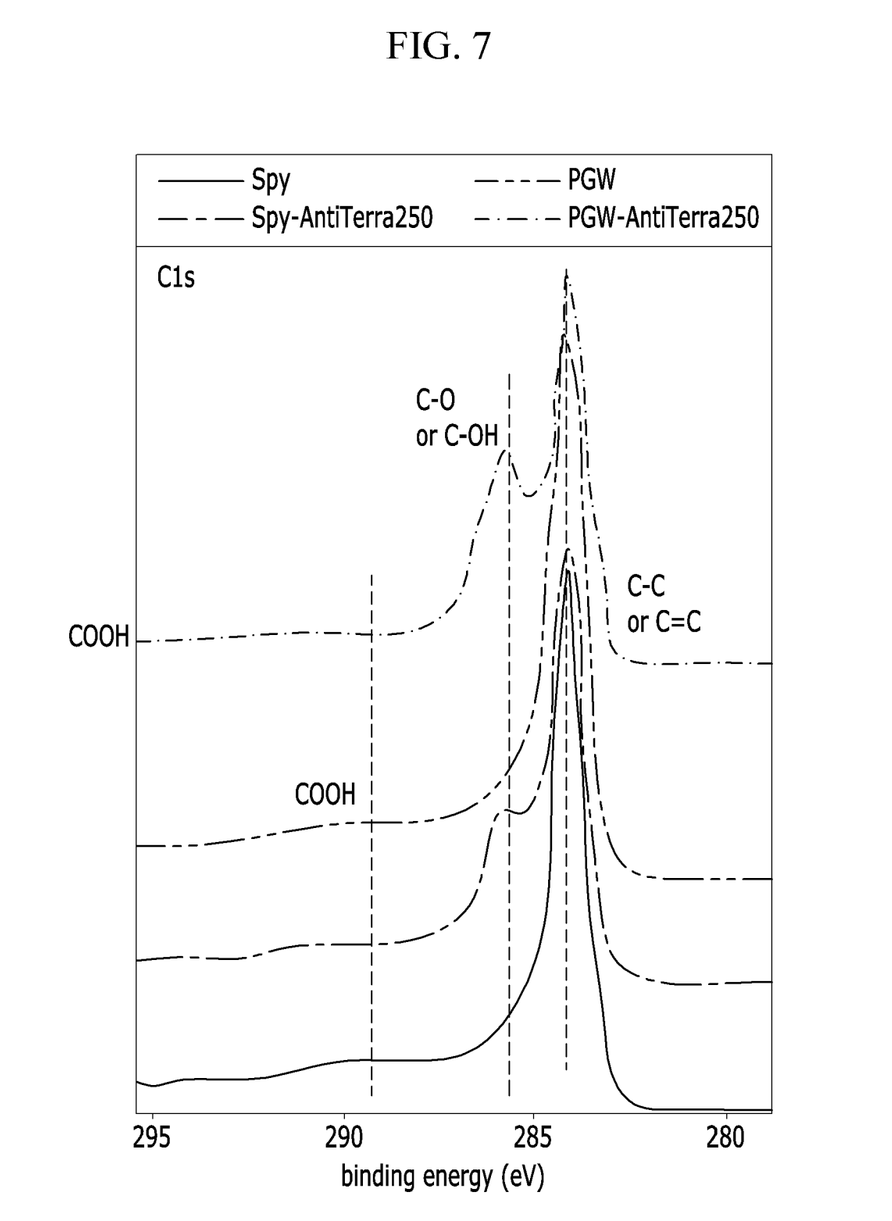
FIG. 7 to FIG. 9 are graphical views showing the results of the XPS analysis of the electrodes of Examples 7 and 9, respectively.
Figure 8:
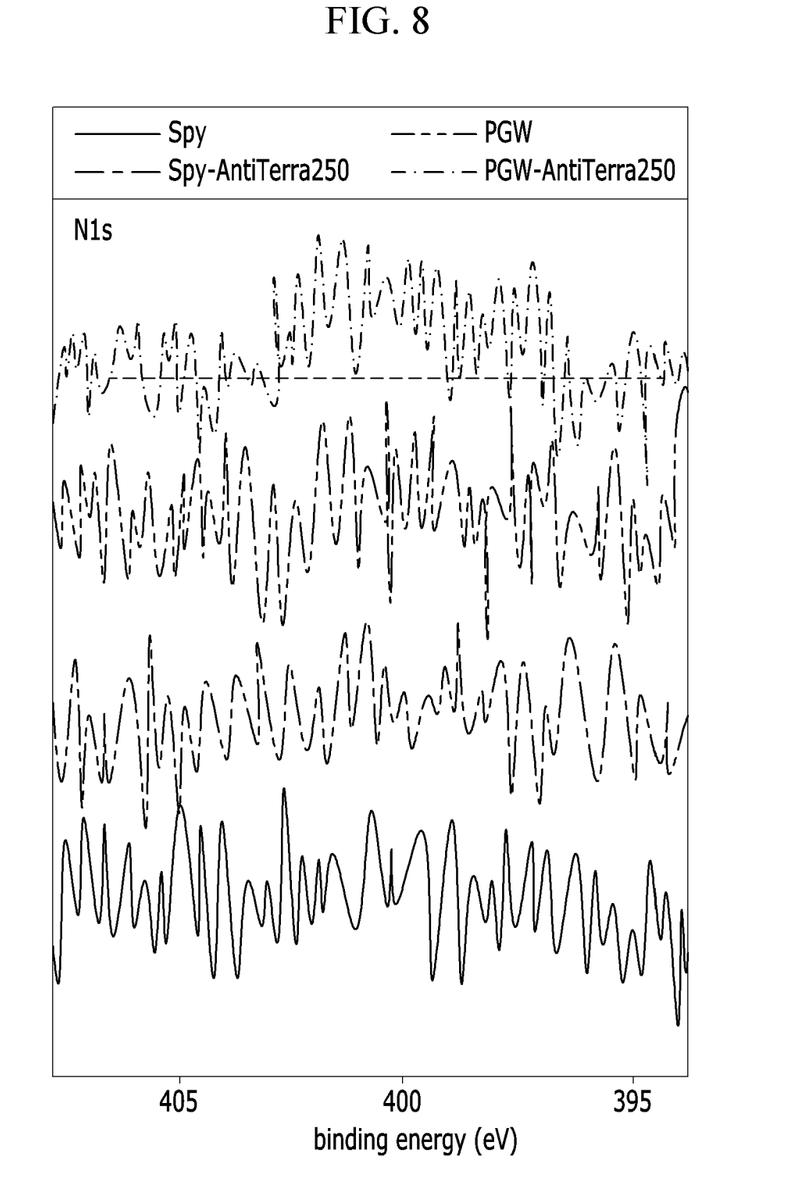
Figure 9:
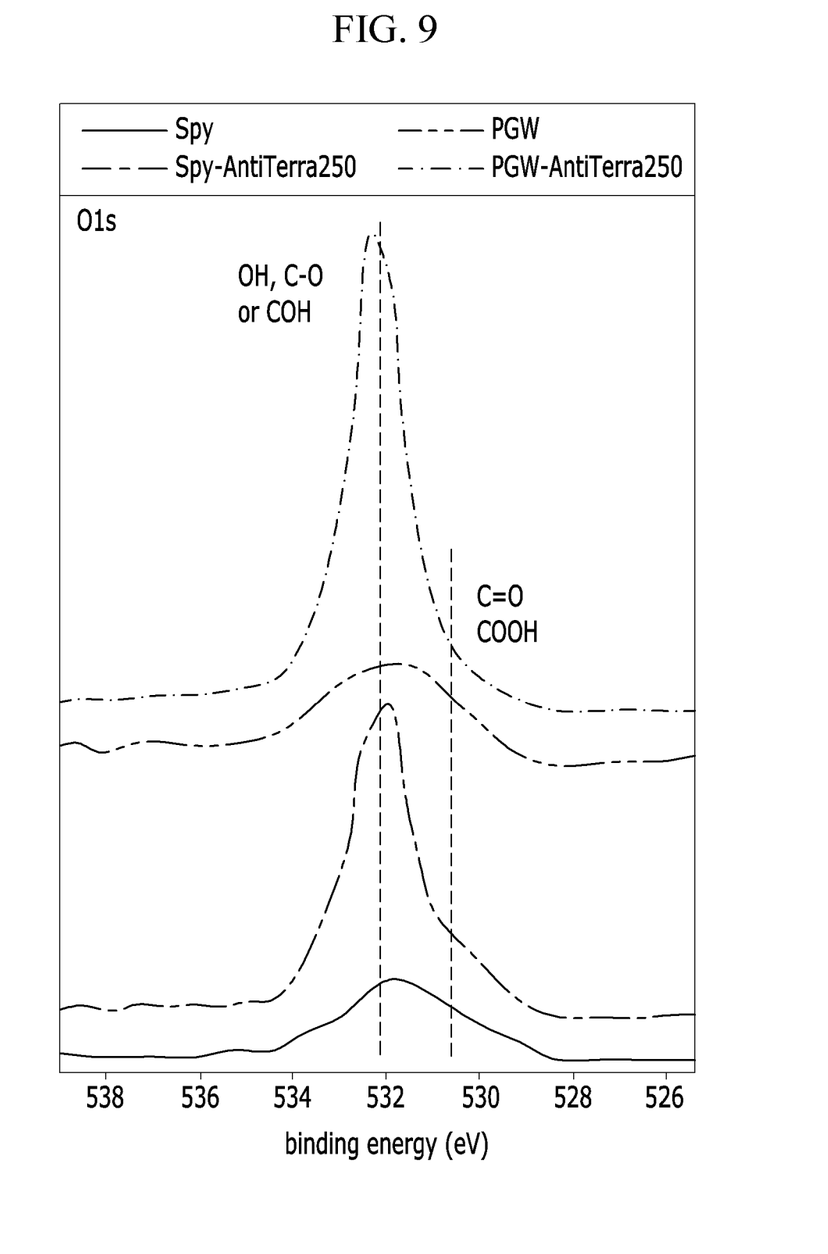

For the electrode thus prepared, XPS analysis is made using ESCALAB 220i-XL (VG Scientific Instrument) and the results are shown in FIG. 7, FIG. 8, and FIG. 9. The results of FIG. 7 to FIG. 9 confirm that after the heat treatment, the component ratio of C—OH increases, and the base line of N1s slightly increases.

Example 8

An electrode is prepared in the same manner as set forth in Example 7, except that Anti-Terra 250 is used in an amount of 20% by weight.

Example 9

An electrode is prepared in the same manner as set forth in Example 7, except that powder activated carbon SPY (manufactured by Samchully Carbotech Co. Ltd.) is used as a conductive material instead of powder activated carbon PGW (from Kuraray Chemical Co. Ltd.).

For the electrode thus prepared, an XPS analysis is made using ESCALAB 220i-XL (VG Scientific Instrument) and the results are shown in FIG. 7, FIG. 8, and FIG. 9. The results of FIG. 7 to FIG. 9 confirm that after the heat treatment, the component ratio of C—OH increases.

Comparative Example 1

An electrode is prepared in the same manner as set forth in Example 1, except that a conductive material not including Anti-Terra 250 and the binder solution thus prepared are mixed in a volume ratio of 73:27 to prepare a slurry.

Experimental Example 1: Production of Capacitive Deionization Apparatus and Evaluation of Ion Adsorption Capacity Thereof (I)

The electrodes prepared in Examples 1 to 6 are used as a cathode. As an anode, an electrode is prepared by using a slurry including PVA as a base polymer, glycidyl trimethylammonium chloride (GTMAC) as a curing agent, and 15 vol % of PGW activated carbon. A polyamide mesh (product name: NITEX 03 (125/45, Sefar AG)) is used as a spacer. The cathode, the anode, and the spacer are assembled to fabricate a capacitive deionization apparatus.

Figure 2:
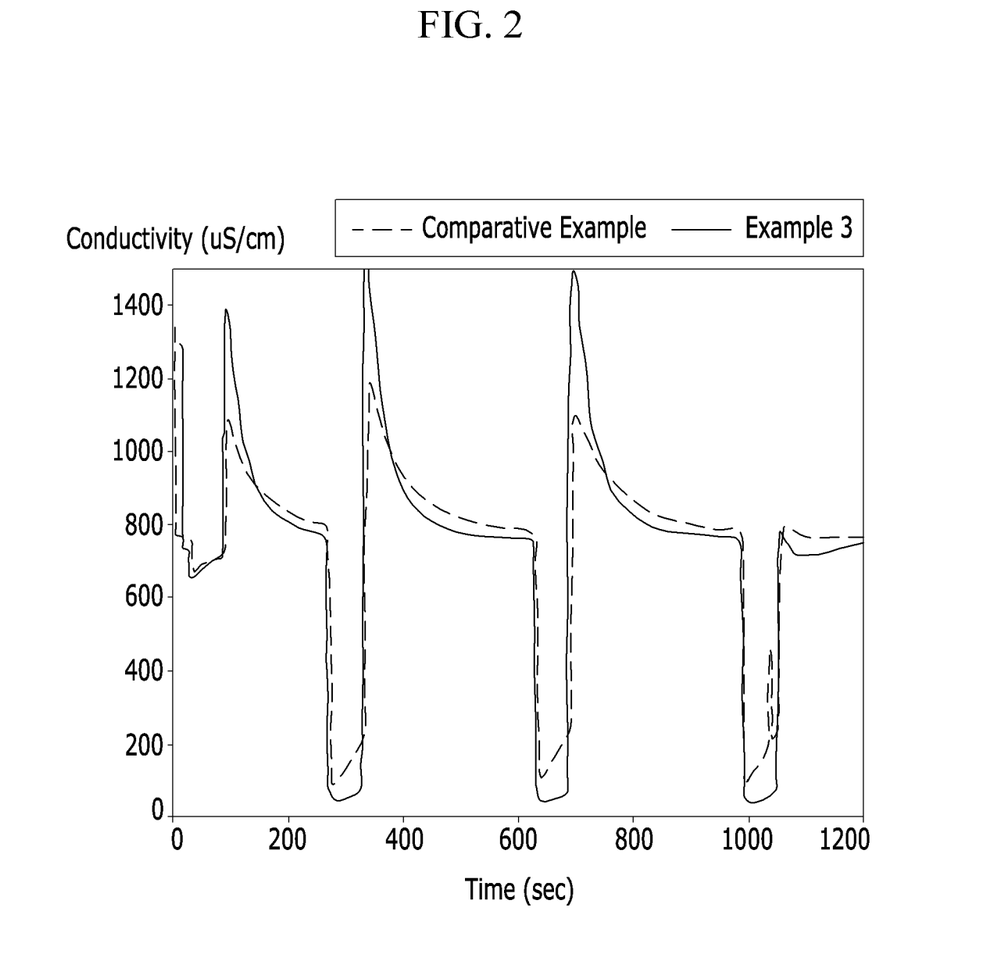
FIG. 2 is a graphical view showing the results of ion adsorption capacity tests of the electrode of Example 3 and a comparative example.

For the capacitive deionization apparatus thus fabricated, deionization performances thereof are evaluated under the following conditions and the results are shown in FIG. 2.

Flow rate: 28 mL/min (5 L/min in 180 cells)

Charge/discharge sequences: 1 min charge/5 min discharge at −0.8 V, three cycles For each electrode, minimum conductivity value is compiled in Table 1.

TABLE 1

|  | Minimum conductivity (uS/cm) |
| --- | --- |
| Comparative Example 1. PGW-PVA27 | 110.1 |
| Example 1. PGW-PVA27-AT10 | 94.8 |
| Example 2. PGW-PVA27-AT20 | 85.4 |
| Example 3. PGW-PVA27-AT30 | 43.2 |
| Example 4. PGW-PVA20-AT10 | 72.4 |
| Example 5. PGW-PVA10-AT10 | 82.7 |
| Example 6. PGW-PVA5-AT10 | 87.6 |

The results of Table 1 and FIG. 2 confirm that the electrodes of Examples 1 to 6 may produce water having higher purity (i.e., water showing lower conductivity) and may hold the ions adsorbed therein longer.

Experimental Example 2: Production of Capacitive Deionization Apparatus and Evaluation of Ion Adsorption Capacity Thereof (II)

The electrodes prepared in Examples 7 and 8 are used as a cathode. As an anode, an electrode is prepared by using a slurry including PVA as a base polymer, glycidyl trimethylammonium chloride (GTMAC) as a curing agent, and 15 vol % of PGW activated carbon. A polyamide mesh (product name: NITEX 03 (125/45, Sefar AG)) is used as a spacer. The cathode, the anode, and the spacer are assembled to fabricate a capacitive deionization apparatus.

For the capacitive deionization apparatus thus fabricated, deionization performances thereof are evaluated under the following conditions and the results are shown in Table 2.

Flow rate: 28 mL/min (5 L/min in 180 cells)

Charge/discharge sequences: 1 min charge/5 min discharge at −0.8 V, three cycles.

TABLE 2

|  | Minimum conductivity (uS/cm) |
| --- | --- |
| Example 7. AT10-PGW-PVA10 | 64.6 |
| Example 8. AT10-PGW-PVA20 | 59.2 |

The results of Table 2 confirm that the electrodes of Examples 7 and 8 having a conductive material surface-coated with Anti-Terra may show a lower minimum conductivity even when they include a small amount of the coated polymer and a small amount of the binder, and they may produce water with high purity.

Experimental Example 3: BET Measurement of the Electrodes

For the electrode of Comparative Example 1 and the electrodes of Examples 1, 4, and 5, nitrogen isothermal adsorption/desorption tests are made to measure a BET surface area, a pore volume, and a T-plot u-pore volume. The results are compiled in Table 3.

TABLE 3

|  | BET surface area (m$^2$/g) | Pore Vol (cc/g) @ P/Po 0.990 | T-plot u-pore Vol (cc/g) |
| --- | --- | --- | --- |
| Comparative Example 1. PGW-PVA27 | 29.9 | 0.025 | 0.016 |
| Example 1. PGW-PVA27-AT10 | 37 | 0.034 | 0.022 |
| Example 4. PGW-PVA20-AT10 | 46.8 | 0.113 | 0.038 |
| Example 5. PGW-PVA10-AT10 | 50.2 | 0.067 | 0.042 |

The results of Table 3 confirm that the electrodes of the examples have higher values of the BET surface area and larger pore volumes, and the electrodes of the examples may have a high level of the BET surface area and large pore volumes even when they use less binder.

Experimental Example 4: BET Measurement of the Electrodes

Zeta potentials of the non-coated activated carbon and the activated carbon coated with Anti-Terra of Examples 7 and 8 are determined in the following manners.

The activated carbon to be analyzed is dispersed in water, and the resulting dispersion is placed in a cuvette for an analysis to which an electrical potential is applied. Under the electrical potential, the velocity of the particle is measured and thereby the electrical characteristics of the particle are represented by a voltage (unit: mV).

Figure 3:
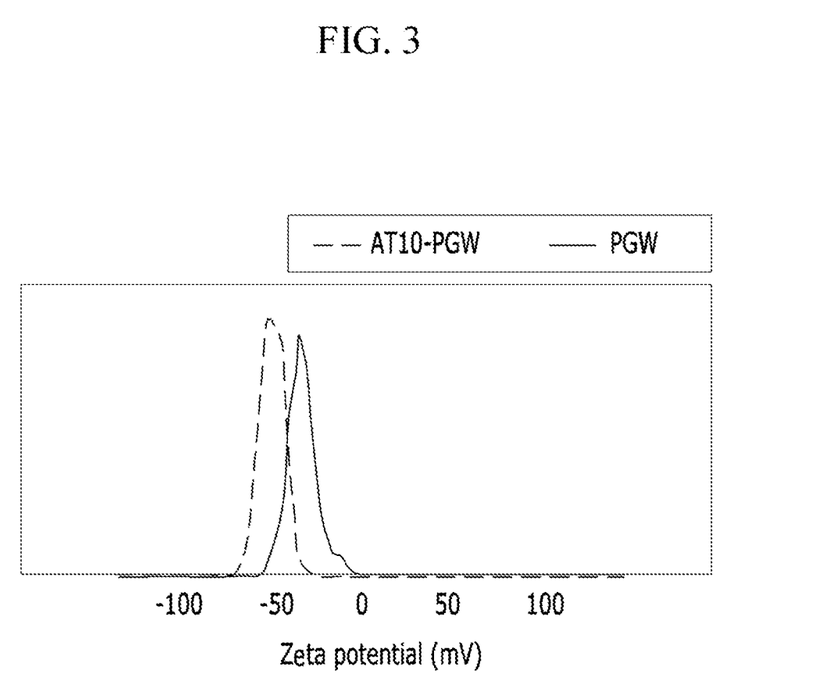
FIG. 3 is a graphical view illustrating the results of a zeta potential analysis of non-coated activated carbon and the coated activated carbon of Example 7.
Figure 4:
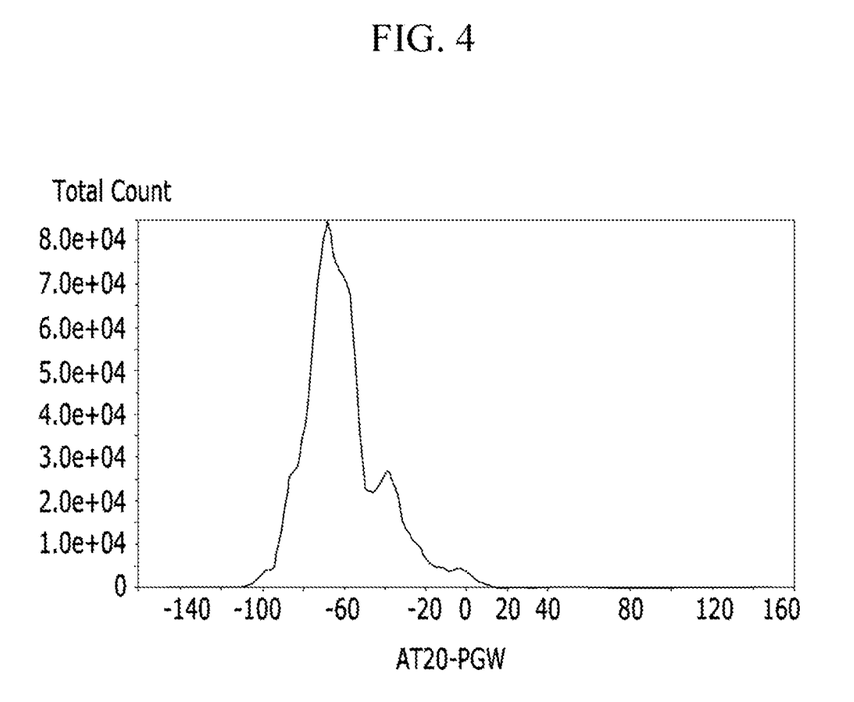
FIG. 4 is a graphical view illustrating the results of a zeta potential analysis of the coated activated carbon of Example 8.

The results are shown in Table 4, FIG. 3, and FIG. 4.

TABLE 4

|  | Zeta-potential (mV) |
| --- | --- |
| PGW | −36.8 |
| Anti-Terra250 10 wt % Coated PGW | −54.2 |
| Anti-Terra250 20 wt % Coated PGW | −60.3 |

The results of FIG. 3 and FIG. 4 and the results of Table 4 confirm that the activated carbon coated with Anti-Terra 250 has a significantly different value of zeta potential from that of the non-coated activated carbon.

While various examples are presented herein, it is to be understood that the present disclosure is not limited to the disclosed embodiments, but, on the contrary, is intended to cover various modifications and equivalent arrangements included within the spirit and scope of the appended claims.

What is claimed is:

1. A capacitive deionization electrode comprising:
   a conductive material including a carbon material, the carbon material including activated carbon, the activated carbon including aluminum (Al) in an amount of about 5 to 30 wt % and silicon in an amount of about 15 to 20 wt % based on a total amount of substances included therein other than carbon; and
   a polymer on a surface of the conductive material, the polymer having at least one functional group in a single polymer chain.

2. The capacitive deionization electrode of claim 1, wherein the conductive material further comprises a porous material selected from $TiO_2$, TiN, $SiO_2$, and $Si_3N_4$; a conductive metal oxide; or a combination thereof.

3. The capacitive deionization electrode of claim 2, wherein the carbon material further comprises at least one selected from carbon nanotubes, carbon aerogel, mesoporous carbon, and graphite oxide.

4. The capacitive deionization electrode of claim 1, wherein the activated carbon has a specific surface area of greater than or equal to about 900 m²/g and an average particle size of less than or equal to about 100 μm.

5. The capacitive deionization electrode of claim 1, further comprising:
an electrically conducting agent and a binder.

6. The capacitive deionization electrode of claim 5, wherein the electrically conducting agent is selected from carbon black, vapor growth carbon fiber (VGCF), natural graphite, artificial graphite, acetylene black, ketjen black, or a carbon fiber; a metallic powder or fiber of copper, nickel, aluminum, or silver; conductive polymers; and a mixture thereof, and
the binder optionally comprises an anion exchange group or a cation exchange group, and the binder comprises a hydrophilic polymer selected from a polyacrylic acid, a poly(acrylic acid-maleic acid) copolymer, polyvinyl alcohol, cellulose, polyvinylamine, chitosan, polyacrylamide, a poly(acrylamide-acrylic acid) copolymer, a poly(styrene-acrylic acid) copolymer, and a combination thereof; or a hydrophobic polymer selected from polystyrene, polyvinylchloride, carboxylated polyvinylchloride, polyvinylfluoride, a polyamide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, and a combination thereof; or a combination thereof.

7. The capacitive deionization electrode of claim 1, wherein the polymer is part of a coating on the surface of the conductive material.

8. The capacitive deionization electrode of claim 1, wherein the polymer comprises 1 to 10 functional groups selected from a carboxyl group (—COOH), —NO$_2$, N, an ammonium salt group (—NR$_3^+$), a phosphate group (PO$_4^{3-}$), a sulfonic acid salt group, and a hydroxyl group.

9. The capacitive deionization electrode of claim 1, wherein the polymer comprises a polyester repeating unit, a polyether repeating unit, an alkyl moiety, a polyaminoamide repeating unit, a polyurethane repeating unit, or a combination thereof.

10. The capacitive deionization electrode of claim 1, wherein the polymer comprises a branched polymer having a functional group at a terminal end thereof.

11. The capacitive deionization electrode of claim 1, wherein the polymer has a weight average molecular weight of greater than or equal to about 100,000.

12. The capacitive deionization electrode of claim 1, wherein the polymer has an acid value of greater than or equal to about 30 mg KOH/g and an amine value of greater than or equal to about 30 mg KOH/g.

13. A method of producing a capacitive deionization electrode, comprising:
obtaining a binder solution including an electrically conducting agent and a binder;
preparing either a conductive material having a polymer coated on a surface thereof or an aqueous dispersion including the conductive material and the polymer, the polymer having at least one functional group in a single polymer chain, the conductive material including a carbon material, the carbon material including activated carbon, the activated carbon including aluminum (Al) in an amount of about 5 to 30 wt % and silicon in an amount of about 15 to 20 wt % based on a total amount of substances included therein other than carbon;
mixing the binder solution with the aqueous dispersion or the conductive material to obtain a slurry; and
applying the slurry on an electrically conducting support.

14. The method of claim 13, wherein the conductive material further comprises a porous material selected from TiO$_2$, TiN, SiO$_2$, and Si$_3$N$_4$; a conductive metal oxide; or a combination thereof.

15. The method of claim 13, wherein the carbon material further comprises at least one selected from carbon nanotubes, carbon aerogel, mesoporous carbon, and graphite oxide.

16. The method of claim 13, wherein the preparing comprises ultra-sonicating the aqueous dispersion to form a coating of the polymer on the conductive material; and separating the conductive material with the coating from the aqueous dispersion.

17. The method of claim 13, wherein the polymer comprises 1 to 10 functional groups selected from a carboxyl group (—COOH), —NO$_2$, N, an ammonium salt group (—NR$_3^+$), a phosphate group (PO$_4^{3-}$), a sulfonic acid salt group, and a hydroxyl group.

18. The method of claim 13, wherein the polymer comprises a polyester repeating unit, a polyether repeating unit, an alkyl moiety, a polyaminoamide repeating unit, a polyurethane repeating unit, or a combination thereof.

19. The method of claim 13, wherein the polymer comprises a branched polymer having a functional group at a terminal end thereof.

20. A capacitive deionization apparatus comprising:
a pair of capacitative electrodes having a flow path therebetween, each of the electrodes including a conductive material and a polymer on a surface of the conductive material, the polymer having at least one functional group in a single polymer chain, the conductive material including a carbon material, the carbon material including activated carbon, the activated carbon including aluminum (Al) in an amount of about 5 to 30 wt % and silicon in an amount of about 15 to 20 wt % based on a total amount of substances included therein other than carbon, and
a power source to apply voltage to the electrodes.

21. The capacitive deionization apparatus of claim 20, wherein the conductive material further comprises a porous material selected from TiO$_2$, TiN, SiO$_2$, and Si$_3$N$_4$; a conductive metal oxide; or a combination thereof.

22. The capacitive deionization apparatus of claim 20, wherein the polymer is part of a coating on the surface of the conductive material.

23. The capacitive deionization apparatus of claim 20, wherein the polymer comprises 1 to 10 functional groups selected from a carboxyl group (—COOH), —NO$_2$, N, an ammonium salt group (—NR$_3^+$), a phosphate group (PO$_4^{3-}$), a sulfonic acid salt group, and a hydroxyl group.

24. The capacitive deionization apparatus of claim 20, wherein the polymer comprises a branched polymer having a functional group at a terminal end thereof.

* * * * *